(12) United States Patent
Watanabe (10) Patent No.: US 6,668,017 B1
(45) Date of Patent: Dec. 23, 2003

(54) APPARATUS AND METHOD FOR DETECTING ADDITIONAL INFORMATION

(75) Inventor: Junya Watanabe, Tokyo (JP)

(73) Assignee: NEC Corporation, Tokyo (JP)

( * ) Notice: Subject to any disclaimer, the term of this patent is extended or adjusted under 35 U.S.C. 154(b) by 621 days.

(21) Appl. No.: 09/672,024

(22) Filed: Sep. 29, 2000

(30) Foreign Application Priority Data

Sep. 29, 1999 (JP) .......................................... 11-276816

(51) Int. Cl.[7] .............................................. H04B 7/66
(52) U.S. Cl. ............................................. 375/240.12
(58) Field of Search .................. 375/240.01, 240.02, 375/240.09, 240.26, 240.27, 240.28, 240.12, 240.13; 382/233, 236, 238; 386/95, 111; 348/423, 700; H04B 1/66

(56) References Cited

U.S. PATENT DOCUMENTS

| 5,874,997 A | * | 2/1999 | Haigh .......................... 348/423 |
| 6,275,535 B1 | * | 8/2001 | Bramley et al. ........ 375/240.25 |
| 2002/0018146 A1 | * | 2/2002 | Matsubayashi ............. 348/700 |

FOREIGN PATENT DOCUMENTS

| JP | 9-191394 A | 7/1997 |
| JP | 10-164349 A | 6/1998 |
| JP | 10-243398 A | 9/1998 |
| JP | 11-74794 | 3/1999 |

OTHER PUBLICATIONS

Vassaux et al. , Scrambling technique fro video object watermarking resisting to MPEG–4, Video/Image Processing and Multimedia Communications 4th, ERASIP–IEEE Region 8 International Symposium on VIPromCom, Jun. 16–19, 2002, pp. 239–244.*

Lesellier et al., Robust wavelet–based arbitrary grid detection for MPEG, Image Processing, 2002. Proceeding. 2002 International Conference on, vol.: 3, Jun. 24–28, 2002. pp.: III–417–III–420 vol. 3.*

* cited by examiner

Primary Examiner—Young Lee
Assistant Examiner—Tung Vo
(74) Attorney, Agent, or Firm—Sughrue Mion, PLLC (57) ABSTRACT

A setting unit inputs compressed-image data, such as MPEG data or the like, a current picture number, sent from a compressed-image analyzer, within one GOP included in the MPEG data analyzed by the compressed-image analyzer, and a degree of coincidence sent from an additional data detector. A position determinator determines whether a picture number regarding a picture of a successive GOP which is to be detected includes additional data, and stores the determined picture number in a position data buffer. The determined picture number is transmitted to the position data determinator. The position determinator transmits an active signal to a switch, when the current picture number coincides with the picture number sent to the position data determinator. On the contrary, the position determinator sends an inactive signal to the switch when the current picture number does not coincide with the picture number sent to the position data determinator. In response to the signal at an active level, the switch controls the additional data detector to output a signal sent from the compressed-image analyzer.

11 Claims, 4 Drawing Sheets

| IMAGE ID INFORMATION | DEGREE OF COINCIDENCE |
|---|---|
| "I" FRAME | 28% |
| "I" FRAME TO 3RD FRAME | 33% |
| "I" FRAME TO 4TH FRAME | 36% |
| "I" FRAME TO 7TH FRAME | 80% |
| "P" FRAME | 12% |
| "P" FRAME TO 2ND FRAME | 28% |
| . . . . . . . . . . . . . | |

FIG. 4

APPARATUS AND METHOD FOR DETECTING ADDITIONAL INFORMATION

BACKGROUND OF THE INVENTION

1. Field of the Invention

The present invention relates to an apparatus and method for detecting additional data which is embodied in compressed-motion image data.

2. Description of the Related Art

The MPEG (Moving Picture Experts Group) standard is known as a set of rules for motion image data compression. In accordance with the MPEG rules specified in ISO (International Organization for Standardization), data is compressed by (1) resolving the frequency of input image data frame by frame using a DCT (Discrete Cosine Transform) technique so as to generate DCT coefficients, and (2) quantizing the generated DCT coefficients while paying no attention to high-frequency components of the resolved frequency. Particularly, pictures of original image data are re-grouped into a GOP (Group Of Pictures) including three types of pictures, "I" picture, "P" picture and "B" picture. A header (SH: Sequence Header) is attached to the GOP, and the GOP with the attached header is transmitted, recorded and reproduced as compressed motion image data. The "I" picture is an Intraframe-Picture, which is encoded within one frame based only on pixel data. The "P" picture is a predictive-interframe picture which is encoded based only on forward directional prediction between frames with a past reference. The "B" frame is a bi-directional picture, which is encoded based on bi-directional predeiction between frames with a past and future references. Predictive encoding is performed with a code, which is DCT (Discrete Cosine Transform) coded based on an error in successive frames, and a motion vector.

There are, thus, great demands for a technique for embodying additional data, such as a signal for preventing reproduction of data, into MPEG data as compressed-motion image data, and a technique for detecting such additional data. It is advantageous, in terms of the processing speed, that such additional data can be detected without performing DCT transformation for the MPEG data.

The above technique for detecting the additional data without performing the DCT transformation is disclosed in Unexamined Japanese Patent Application KOKAI Publication No. H11-74794. In the technique disclosed in the publication, additional data is a spread-spectrum signal, and is embodied in serial components of DCT spectrums of original image data An additional data detection circuit extracts the serial components, performs inverse spreading processing, and acquires additional data without performing inverse DCT transformation for the DCT spectrums of the original image data.

In this prior-art technique, it is necessary to detect whether additional data or what additional data is embodied throughout the entire pictures of a GOP of the MPEG data. Therefore, it is very time-consuming to detect the presence of additional data or the contents of additional data. When to reproduce pictures of image data in rapid motion, the image data is undesirably deteriorated. In the case where additional data is attached only to some pictures within one GOP, instead of being attached to the entire pictures, it is no use detecting the entire pictures.

SUMMARY OF THE INVENTION

It is accordingly an object of the present invention to provide an apparatus and method for detecting additional data added to compressed-image data at speed.

Another object thereof is to provide an apparatus and method for detecting additional data added to compressed-image data with high efficiency.

In order to achieve the above object, according to the first aspect of the present invention, there is provided an additional data detection system comprising:

an analyzer which receives and analyzes compressed-image data, extracts and outputs image data of a predetermined image, and also outputs image ID (identification) information regarding the analyzed image data;

a degree-of-coincidence determinator which determines a degree of coincidence of the image data output by the analyzer and image data of an image including pre-set additional data, and outputs a signal representing presence of additional data when the determined degree of coincidence is equal to or greater than a predetermined reference value; and a setting unit which receives the degree of coincidence output by the degree-of-coincidence determinator and the image ID information output by the analyzer, obtains a correlation between the image ID information and the degree of coincidence, specifies image ID information of an image which is estimated to have a predetermined degree of coincidence, and operates the degree-of-coincidence determinator to determine a degree of coincidence of image data at a timing the specified image ID information is output from the analyzer.

According to this structure, the setting unit determines the image ID information of an image which is estimated to have a predetermined high degree of coincidence, based on the image ID information and the degree of coincidence, and operates the additional data detector at a timing the image ID information is output. The additional data detector can detect additional data with high efficiency, because it needs to carry out only a process for detecting image data which is estimated to have a quite high degree of coincidence.

BRIEF DESCRIPTION OF THE DRAWINGS

These objects and other objects and advantages of the present invention will become more apparent upon reading of the following detailed description and the accompanying drawings in which.

DETAILED DESCRIPTION OF THE PREFERRED EMBODIMENT

A preferred embodiment of the present invention will now be explained with the accompanying drawings.

Figure 1:
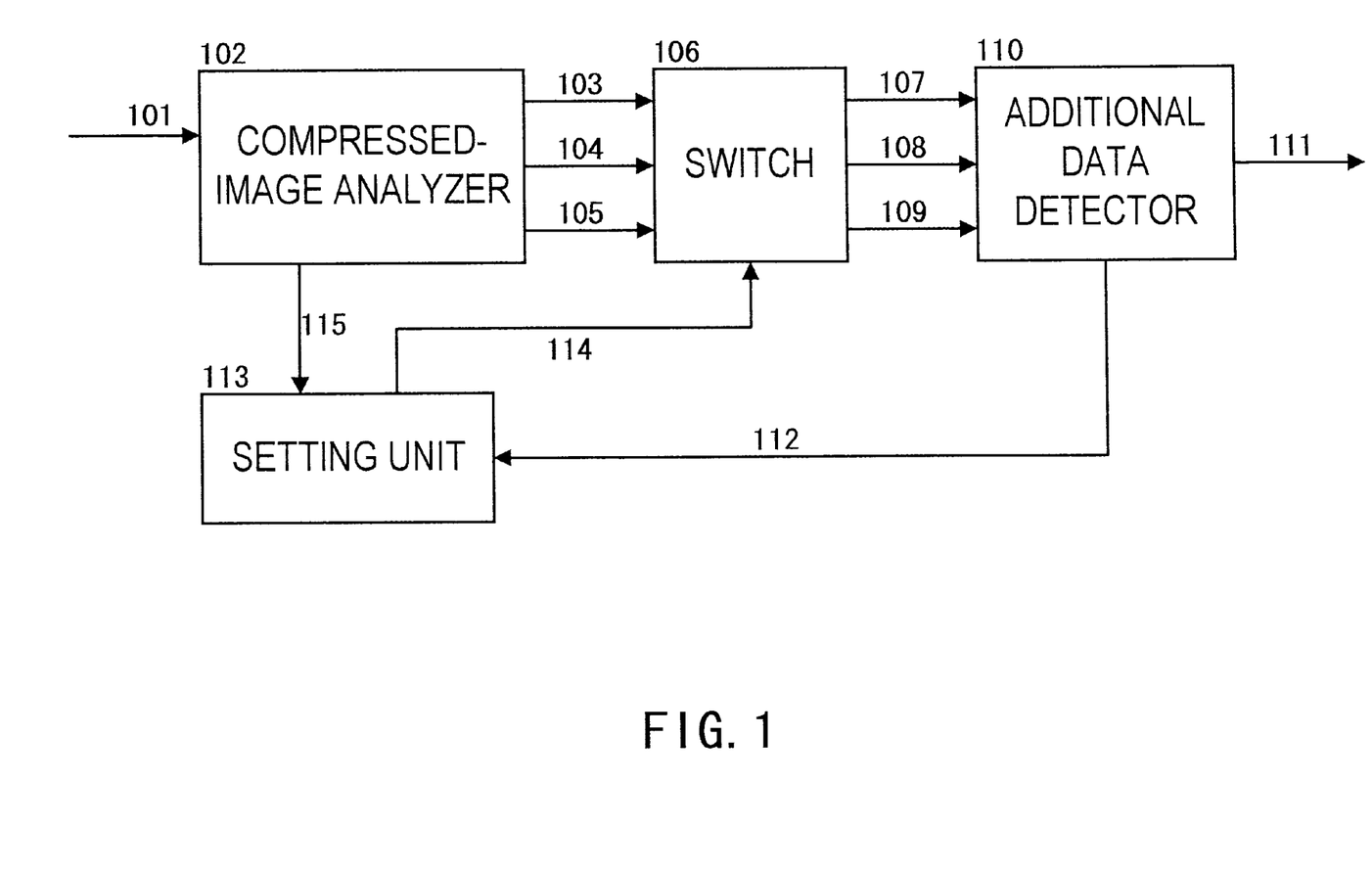
FIG. 1 is a block diagram showing an additional data detection apparatus of the present invention.

FIG. 1 is a block diagram of an exemplary embodiment of an additional data detection apparatus according to the present invention.

The additional data detection apparatus 100 comprises a compressed-image analyzer 102 for inputting compressed image data such as MPEG data, etc., a switch 106 for switching an output of the compressed-image analyzer 102, an additional data detector 110 outputting a detected result of additional data based on the output of the switch 106, and a setting unit 113 outputting target data including additional data to be detected.

Input data 101 of the additional data detection apparatus 100 is compressed-image data, such as MPEG data, etc. This compressed image data is a set of image signals. Particularly, for example, when one screen-sized image is displayed with a plurality of pixels, the image is set as one fame, the frame being divided into slices in a horizontal scanning direction, each slice being divided into macro-blocks, each macro-block being divided into blocks, each block being DCT coded so as to generate DCT coefficient data, the DCT coefficient data being quantized, and the quantized DCT coefficient data of the block being set as time series signals and compressed. Output data 111 of the additional data detection apparatus 100 is a signal, which is active, i.e., at a logic "1" level when a pre-set type of additional data is detected in the input compressed-image data, and which is inactive, i.e., is at a logic "0" level when no additional data is detected.

The compressed-image analyzer 102 inputs the input data 101 including MEG data The compressed-image analyzer 102 analyzes the input MPEG data, and extracts a particular set of DCT coefficients of a particular picture in a GOP (Group Of Pictures) of the input MPEG data or a particular set of DCT coefficients of a particular block in the input MPEG data. In the MPEG standard, DCT coefficients are set as time series signals in predetermined order. In more particular, in the case where a predetermined number of DCT coefficients are all "0" in series, data is compressed on the basis of RUN data representing the number of the DCT coefficients which are all "0", and VAL data representing the number of the DCT coefficients which are not "0" in series. The compressed-image analyzer 102 extracts a particular set of DCT coefficients, for example, serial components of a particular set of DCT coefficients, based on the RUN data and the VAL data.

The compressed-image analyzer 102 outputs to the switch 106 through a track 103 analyzing-start information representing that analyzing of a target area (a particular picture or a particular block) to be detected is started, based on the analyzed result. Note that the target area, which is included in the MPEG data, is one from which a set of DCT coefficients are to be extracted. The compressed-image analyzer 102 outputs to the switch 106 through a track 104 a set of DCT coefficients extracted from the target area, and outputs to the switch 106 through a track 105 analyzing-completion information representing that the analyzing of the target area is completed.

The compressed-image analyzer 102 determines a picture ID number and a block ID number of the image data being analyzed, and supplies the setting unit 113 via a track 115 with the determined picture ID numbers.

When a signal (a signal for specifying target image data (a picture and/or a block) to be detected whether to include any additional data) to be transmitted from the setting unit 113 through the track 114 is active, the switch 106 outputs to the additional data detector 110 through a track 107 data transmitted from the compressed-image analyzer 102 through the track 103, as is, outputs to the additional data detector 110 through a track 108 data transmitted from the compressed-image analyzer 102 through the track 104, as is, and outputs to the additional data detector 110 through a track 109 data transmitted from the compressed-image analyzer 102 though the track 105, as is. When a signal transmitted from the setting unit 113 through the track 114 is inactive, the switch 106 outputs no data to the additional data detector 110.

The additional data detector 110 inputs the analyzing-start information transmitted from switch 106 through the track 107, a set of DCT coefficients transmitted from the switch 106 through the track 108, and the analyzing-completion information transmitted from the switch 106 through the track 109. Further, the additional data detector 110 stores a set of DCT coefficients which are set in advance. This set of DCT coefficients are the ones which can be obtained (or should be obtained) in the case where any target additional data to be detected, for example, a signal for preventing reproduction of data is added to the MPEG data.

On the basis of such input data, the additional data detector 110 calculates a degree of coincidence of the additional data attached to the target image data and the additional data stored in advance in the additional data detector 110. The additional data detector 110 makes the output data 111 active when the calculated result of the degree of coincidence is equal to or greater than a predetermined value, and makes the output data 111 inactive when the calculated result of the degree of coincidence is lower than a predetermined value. Further, the additional data detector 110 outputs a signal representing the calculated degree of coincidence to the setting unit 113 through a track 112.

The degree of coincidence is a correlation coefficient between the set of DCT coefficients, which are input to the additional data detector 110 though the track 104, and the set of DCT coefficients of particular additional data stored in advance in the additional data detector 110. The correlation coefficient may be calculated to find a correlation between particular DCT coefficients within one set of DCT coefficients. The larger the calculated correlation coefficient, the higher the degree of coincidence.

The degree of coincidence may be a ratio or product of particular spectrum values of the DCT coefficients. In more particular, the degree of coincidence may be a ratio B/A or a product of A×B of a particular coefficient B, included in the set of DCT coefficients of the particular additional data stored in advance in the additional data detector 110, to/and a particular coefficient A, included in the set of DCT coefficients input to the additional data detector 110 through the track 108. The larger the calculated ratio of B/A or product of A×B, the higher the degree of coincidence. Similarly, the degree of coincidence may be an inverse value of an absolute value of a difference (A−B). In this case, the larger the inverse number, the higher the degree of coincidence. In addition, the degree of coincidence may arbitrarily be defined on the bases of a plurality of coefficients A and a plurality of coefficients B. For example, the product P=A×B may be expressed as P=A1×A2×B1×B2 or P=(A1+A2)×(B1+B2) based on a plurality of coefficients A1, A2, B1 and B2.

Figure 2:
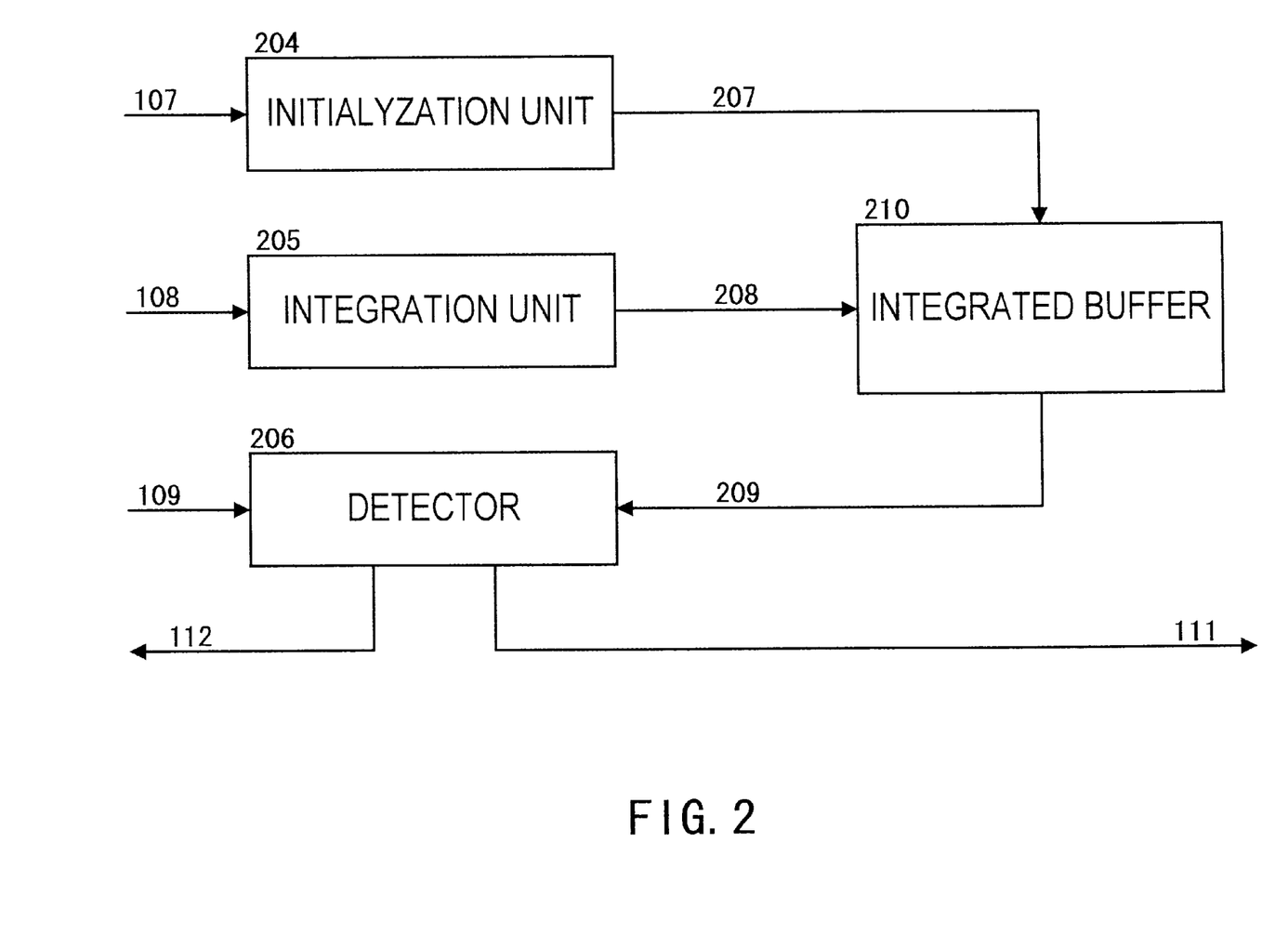
FIG. 2 is a block diagram showing an additional data detector.

FIG. 2 is a block diagram showing the structure of the additional data detector 110. The additional data detector 110 comprises an integrated buffer 210, an initialization unit 204 initializing the integrated buffer 210, an integration unit 205 inputting a set of DCT coefficients and outputting the input DCT coefficients to the integrated buffer 210, and a detector 206.

The initialization unit 204 inputs analyzing-start data transmitted from the switch 106 through the track 107, and resets data stored in the integrated buffer 210 through a track 207.

The integrated unit 205 inputs a type of picture, RUN data, VAL data, etc. which are transmitted from the switch 106 through the track 108, and transmits the input data to the integrated buffer 210 through a track 208.

The integrated buffer 210 inputs the type of picture, RUN data, VAL data, etc., and stores all those data.

In response to transmission of analyzing-analyzing-completion information transmitted from the switch 106 through the track 109, the detector 206 inputs output data of the integrated buffer 210, and compares the output data with a set of DCT coefficients which are set in advance. Based on this comparison, the detector 206 outputs to the setting unit 113 through a track 112 a degree of coincidence of additional data embodied in the input data and target additional data to be detected. The detector 206 outputs to an external device, which is mounted external to the additional data detection apparatus, through the track 111 a detected result of the additional data based on the degree of coincidence.

In more particular, the detector 206 inputs the analyzing-completion information transmitted form the switch 106 through the track 109. The detector 206 then receives a set of DCT coefficients of input image data from the integrated buffer 210 through a track 209, when the analyzing of input image data is completed. The detector 206 calculates the degree of coincidence of the additional data embodied in the input image data and the particular additional data. The particular additional data and a calculation program are stored in a non-illustrative memory in the detector 206. Furthermore, the detector 206 makes the detected result active, i.e., at a logic "1" level, and outputs the active data to the external device through the track 111, when the degree of coincidence is equal to or greater than a predetermined value. The detector 206 makes the detected result inactive, i.e., at a logic "0" level, and outputs the inactive data to the external device through the track 111, when the degree of coincidence is smaller than a predetermined value.

The setting unit 113 is a unit for controlling the switch 106, and prepared for specifying an original image of target data included in the compressed image data and detecting any additional data embodied in the original image. The setting unit 113 inputs image ID information, such as a block ID number for identifying a block or a picture ID number for identifying a picture, of image data being analyzed by the compressed-image analyzer 102. This is done for identifying the position of target data included in compressed-image signals as tie series signals. When to detect the target data in the unit of pictures, the setting unit 113 may also specify a particular slice of the original picture. Further, the amount of data to be detected may be reduced, by, for example, detecting a part of the specific slice.

The setting unit 113 inputs also the degree of coincidence which is detected and transmitted by the additional data detector 110 though the track 112.

The setting unit 113 stores the image ID information and the degree of coincidence corresponding to each other. The setting unit 113 specifics image ID information which is estimated to have the highest degree of coincidence among any other image ID information, based on the record of the image ID information and the degrees of coincidence. The setting unit 113 activates the track 114 at a timing the compressed-image analyzer 102 outputs the estimated image ID information.

In the MPEG standard, the number of pictures included in one GOP is a constant number, for example, equal to or smaller than 15, and is changed in accordance with the motion of image data. The first picture in one GOP is always picture "1". If a picture having the degree of coincidence equal to or greater than a predetermined value is the 1 st picture in one GOP, that is, if the picture ID number of a picture is "1", the setting unit 113 specifies only one single frame and outputs the specified frame to the switch 106 though the track 114. If a picture ID number of a picture having the degree of coincidence equal to or larger than a predetermined number is in a range between "2" and "15", the setting unit 113 specifies any one of various types of, I, P and B pictures. The target data to be detected may be specified not only in the unit of pictures, but also in the unit of slices or blocks.

Figure 3:
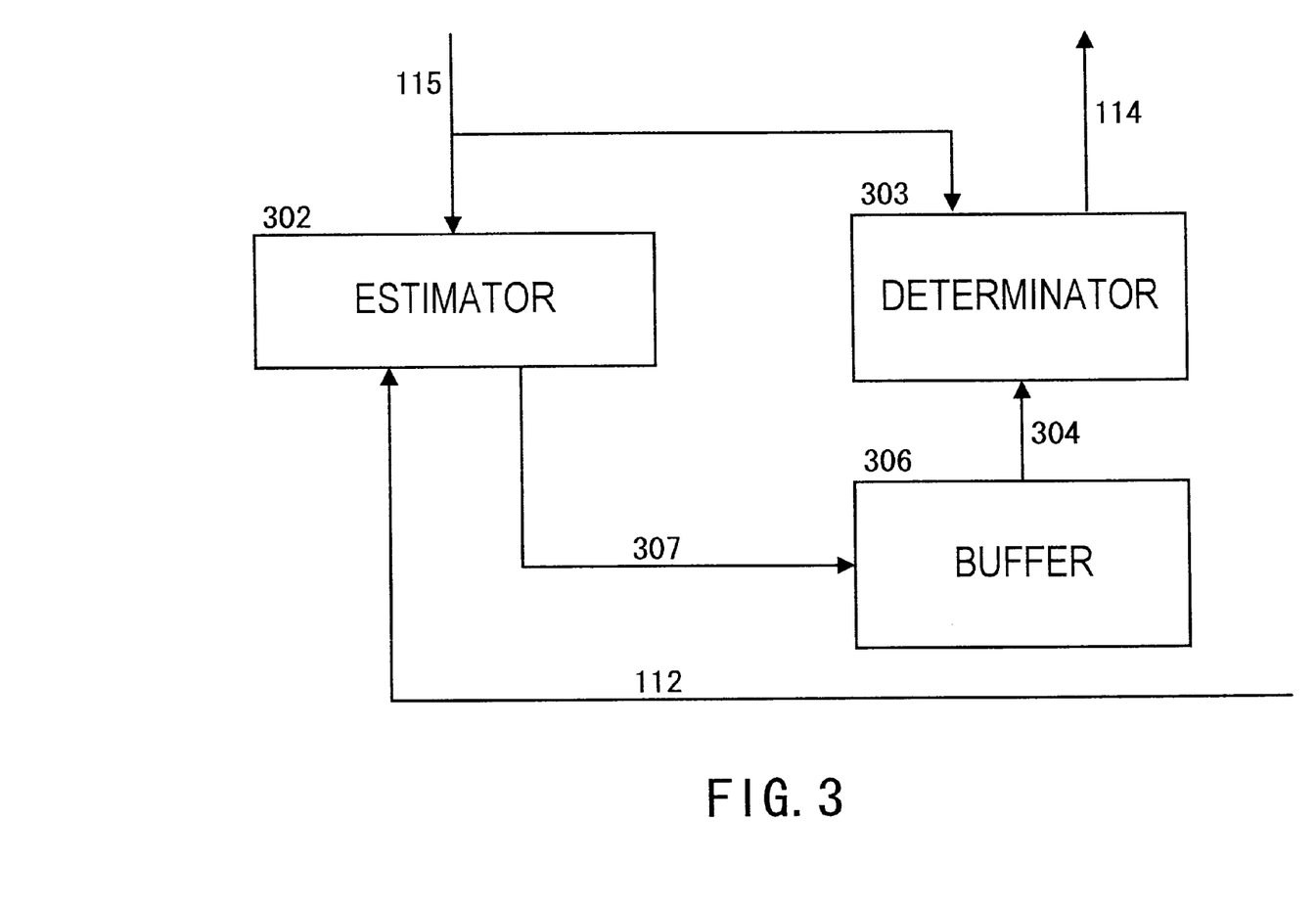
FIG. 3 is a block diagram showing a setting unit which sets target data to be detected.

FIG. 3 is a block diagram showing the structure of the setting unit 113. The setting unit 113 comprises an estimator 302 inputting a degree of coincidence which the detector 206 outputs, a position determinator 303 activating the track 114 when target data to be detected has been transmitted to the setting unit 113, and a position data buffer 306 storing target data to be detected.

The setting unit 113 inputs an image ID number, transmitted from the compressed-image data is image data of a predetermined image (in the above example, an image of the fourth block). When determined that the compressed-image data is the image data of the predetermined image, it outputs a starting signal to the switch 106 through the track 103. That is, in the above example, the compressed-image analyzer 102 outputs a starting signal, when supplying of the image data of the image of the fourth block is started Subsequently, the compressed-image analyzer 102 outputs a set of extracted DCT coefficients to the switch 106 through the track 104. After the supplying of the fourth block is completed, the compressed-image analyzer 102 outputs a completion signal to the additional data detector 110 via the switch 106 through the track 109.

In the case where each picture including the specified fourth block is estimated to have a preferable degree of coincidence on the basis of the past data, the setting unit 113 outputs an active signal to the switch 106 through the track 114. On the contrary, in the case where such a picture is estimated as not to have a preferable degree of coincidence on the basis of the past data, the setting unit 113 outputs an inactive signal to the switch 106 through the track 114.

Figure 4:
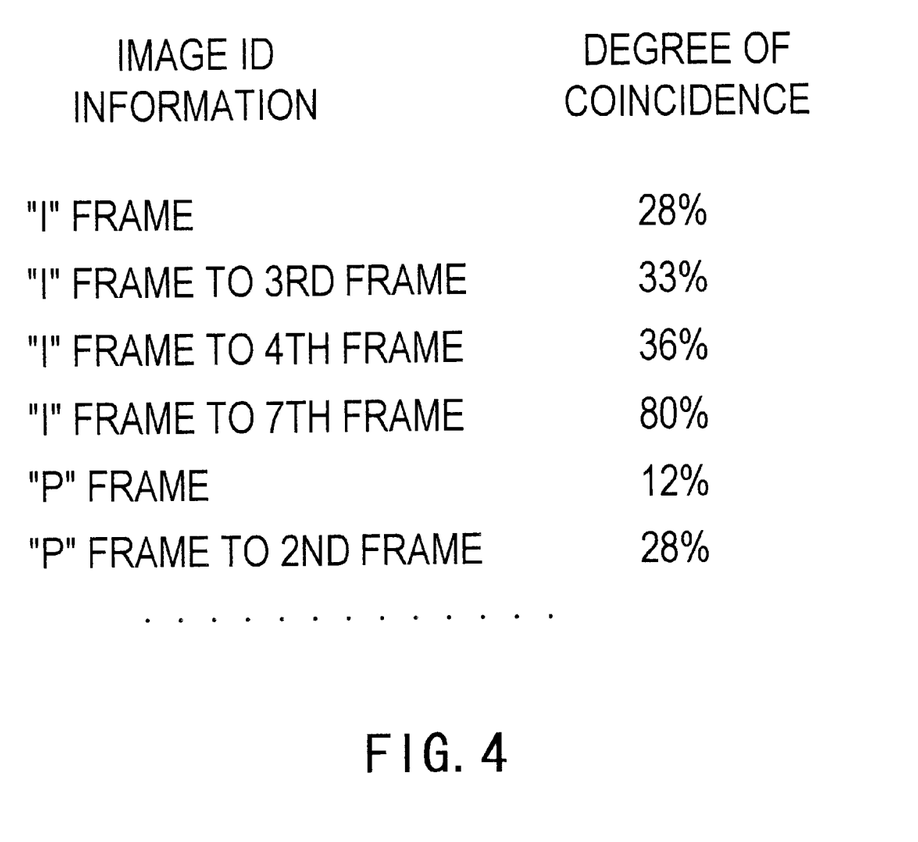
FIG. 4 is a diagram showing a correlation between image ID information and degrees of coincidence (matching degrees), in a corresponding manner, for explaining operations of the additional data detection apparatus shown in FIG. 1.

FIG. 4 illustrates image ID information and degrees of coincidence. The image ID information and the degrees are stored in the internal memory. In the case where the compressed-image analyzer 102 outputs image ID information, representing that the frames of "I" frame to the third fame within one picture are analyzed, relatively a high degree of coincidence can be expected. The compressed-image analyzer 102 outputs an active signal. On the contrary, in the case where like compressed-image analyzer 102 outputs image ID information, representing that the frames of "I" frame to the seventh frame within one picture are analyzed, relatively a low degree of coincidence is expected. The compressed-image analyzer 102 outputs an inactive signal. Note that the statistical method for estimating the degree of coincidence is arbitrary.

In the case where an active signal is transmitted to the switch 106 through the track image analyzer 102 through the track 115, of the target image data being analyzed by the compressed-image analyzer 102. The setting unit 113 inputs also a degree of coincidence, which is transmitted from the additional data detector 110 through the track 112 and output by the additional data detector 110, and stores the input image ID number and the degree of coincidence in a manner corresponding to each other in the memory.

The setting unit 113 comes out a process for taking statistics of the past data stored in the internal memory. The setting unit 113 estimates a timing (image ID information) at which the highest degree of coincidence of image data can be obtained. The setting unit 113 sets an image ID number of image data having the estimated highest degree of coincidence into the position data buffer 306.

The position determinator 303 compares image ID information sent from the compressed-image analyzer 102 through the track 115 and image ID information stored in the position data buffer 306. When determined that both image ID information coincide with each other with a high degree of coincidence, the position determinator 303 transmits an active signal to the switch 106 through the track 114. On the contrary, when determined that both image ID information do not coincide with each other with a high degree of coincidence, the position determinator 303 transmits an inactive signal to the switch 106 through the track 114.

Operations of the additional data detection apparatus 100 having the above structure will now be described.

A user sets target image data to be analyzed and a set of DCT coefficients into the compressed-image analyzer 102. For example, the user sets thereto the fourth block of each picture included in the target image data.

The user registers the set of DCT coefficients corresponding to additional data to be extracted, into the memory of the additional data detector 110.

When the compressed-image analyzer 102 receives compressed-image data, it analyzes the image data The compressed-image analyzer 102 determines whether the 114, the switch 106 supplies the additional data detector 110 with the transmitted signal as is. The additional data detector 110 compares the registered DCT coefficients and a set of DCT coefficients which are set in advance, and obtains a degree of coincidence of the both sets of DCT coefficients. If the obtained degree of coincidence is equal to or greater than a reference value, the additional data detector 110 outputs an active signal for specifying the presence of additional data. On the contrary, if the obtained degree of coincidence is lower than a reference value, the additional data detector 110 outputs an inactive signal for specifying that no additional data is included. The external device, which is mounted external to the additional data detection apparatus, determines the presence of the additional data attached to the target image data based on the active or inactive signal, and carries out a process for extracting additional data in the compressed image data, as needed.

The signal representing the degree of coincidence which is obtained by the additional data detector 110 is sent to the setting unit 113. The estimator 302 of the setting unit 110 additionally stores in the internal memory the image ID information and information representing the degree of coincidence in a manner corresponding to each other. The estimator 302 carries out a statistical process for taking statistic of the stored data including the additionally-stored information. After this, the estimator 302 specifies target image data including additional information to be detected, and sets its image ID information to the position data buffer 306.

The estimator 302 generates, for example, random numbers at an arbitrary timing inside the estimator 302. The estimator 302 variously changes the timing at which the switch 106 is activated, and stores the resultant changes in the internal memory. By doing so, even in the case where the position of additional data embodied in the input image data is changed, such additional data can easily be detected According to the so-far described embodiment, only the target data, from which a set of DCT coefficients having relatively a high degree of coincidence are extracted, is detected. Hence, the amount of time required for calculating the DCT coefficients can be decreased, and the amount of time required for detecting additional data attached to the image data can be reduced.

According to the present invention, additional data can be detected with high efficiency, even in the case where such additional data is not embodied in the entire pictures or blocks of compressed image data, such as MPEG data or the like, ie., even in the case where such additional data is embodied in only one or more pictures or blocks of the compressed image data.

The present invention is not limited to the above-described embodiment, and various changes and modifications can be made. For example, the structure of blocks of image data can arbitrarily be changed. In addition, the operations of the additional data detection apparatus can appropriately be modified.

The present invention can be employed not only for detection of additional data in MPEG data, but also for determination of whether additional data is included in any other arbitrary types of image data.

Various embodiments and changes may be made thereonto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. H11-276816 filed on Sep. 29, 1999, and including specification, claims, drawings and summary. The disclosure of the above Japanese Patent Application is incorporated herein by reference in its entirety.

What is claimed is:

1. An additional data detection system comprising:

an analyzer which receives and analyzes compressed-image data, extracts and outputs image data of a predetermined image, and also outputs image ID (identification) information regarding the analyzed image data;

a degree-of-coincidence determinator which determines a degree of coincidence of the image data output by said analyzer and image data of an image including pre-set additional data, and outputs a signal representing presence of additional data when the determined degree of coincidence is equal to or greater than a predetermined reference value; and a setting unit which receives the degree of coincidence output by said degree-of-coincidence determinator and the image ID information output by said analyzer, obtains a correlation between the image ID information and the degree of coincidence, specifies image ID information of an image which is estimated to have a predetermined degree of coincidence, and operates said degree-of-coincidence determinator to determine a degree of coincidence of image data at a timing the specified image ID information is output from said analyzer.

2. The additional data detection system according to claim 1, wherein:
  a switch is arranged between said analyzer and said additional data detector, and
  said setting unit activates said switch at the timing the image ID information of the image which is estimated to have a predetermined degree of coincidence is output from said analyzer, and supplies said degree-of-coincidence determinator with image ID information from said analyzer.

3. The additional data detection system according to claim 2, wherein said setting unit:
  receives the degree of coincidence which is output by said degree-of-coincidence determinator and the image ID information which is output by said analyzer;
  stores the degree of coincidence and the image ID information in a corresponding manner;
  statistically processing a set of the stored degree of coincidence and the image ID information; and
  activating said switch at the timing the image ID information of the image which is estimated to have a predetermined degree of coincidence is output from said analyzer.

4. The additional data detection system according to claim 1, wherein:
  the compressed-image data includes a plurality of blocks in one frame;
  said analyzer transmits a set of DCT coefficients of each of the plurality of blocks to said switch; and
  said additional data detector obtains the degree of coincidence based on the set of DCT coefficients which are to be supplied from said switch.

5. The additional data detection system according to claim 2, wherein:
  said analyzer transmits to the setting unit block ID information for identifying the plurality of blocks which are set in time series within the frame; and
  said setting unit stores block ID information of a block having a degree of coincidence which is equal to or greater than a predetermined value, and activates said switch when the block ID information output from said analyzer coincides with the stored block ID information.

6. The additional data detection system according to claim 1, wherein:
  the compressed-image data includes at least one of an "I" (Intraframe) picture, which is encoded within one frame based only on pixel data, a "P" (Predictive) picture, which includes the "I" picture and an interframe picture encoded based only on forward directional prediction between frames with a past reference, and a "B" (Bi-directional) picture encoded based on bi-directional prediction between frames with both a past and future references;
  said compressed-image analyzer transmits a set of DCT coefficients of each of the pictures to said switch; and
  said additional data detector obtains the degree of coincidence based on the set of DCT coefficients which are to be sent form said switch.

7. The additional data detection system according to claim 3, wherein:
  said compressed-image analyzer transmits to said setting unit picture ID information for identifying pictures of the compressed-image data which are set in time series within one frame; and
  said setting unit stores picture information regarding a picture whose degree of coincidence is equal to or greater than a predetermined value, and activates said switch when the picture ID information to be sent from said analyzer coincides with the stored picture ID information.

8. The additional data detection system according to claim 1, wherein said additional data detector obtains a degree of coincidence of one or more particular DCT coefficients A within the set of DCT coefficient sent from said switch and one or more pre-stored DCT coefficients B of predetermined pre-stored additional data.

9. The additional data detection system according to claim 1, a degree of coincidence of one DCT coefficient A and one DCT coefficient B is a quotient of B/A, a product of B×A, or a reciprocal of (Ai−Bi).

10. A method for detecting whether additional data is included in compressed-image data, which is formed, when one screen-sized image is set as one frame, by dividing the frame into slices in a horizontal scanning direction, dividing each of the slices into macro-blocks, dividing each of the macro-block into blocks, DCT coding each of the blocks so as to generate a set of DCT coefficient, quantizing the set of DCT coefficient, transforming the quantized set of DCT coefficients of the block into time series signals as compressed-image data, and adding additional data to the compressed-image data, said method comprising:
  inputting compressed-image data including a set of image DCT coefficients as a set of DCT coefficient of the compressed-image data and a particular set of DCT coefficients which are obtained by performing DCT transformation for particular additional data;
  obtaining a degree of coincidence of a set of preregistered DCT coefficients and a set of DCT coefficients of each block which are extracted from compressed-image data;
  storing block ID information for identifying a position of a block in time series within one frame, when the obtained degree of coincidence is equal to or greater than a predetermined value;
  comparing block ID information of compressed-image data which is to be input and pre-stored block ID information, obtaining a degree of a set of DCT coefficients of the compressed-image data and the set of pre-registered DCT coefficients when the block ID information of the compressed-image data coincides with the pre-stored block ID information, and determining that the particular additional data is included in the compressed-image data when the obtained degree of coincidence is equal to or greater than a predetermined value.

11. A method for detecting additional data included in compressed-image data, which is formed, when one screen-sized image is set as one frame, by dividing the frame into slices in a horizontal scanning direction, dividing each of the slices into macro-blocks, dividing each of the macro-block into blocks, DCT coding each of the blocks so as to generate a set of DCT coefficient, quantizing the set of DCT coefficient, transforming the quantized set of DCT coefficients of the block into time series signals as compressed-image data, and adding additional data to the compressed-image data, and
  wherein the compressed-image data includes at least one of an "I" (intraframe) picture, which is encoded within one frame based only on pixel data, a "P" (Predictive) picture, which includes the "I" picture and an interframe picture encoded based only on forward directional prediction between frames with a past reference, and a "B" (Bi-directional) picture encoded based on bi-directional prediction between frames with both a past and future references, and said method comprising:

comparing a predetermined set of DCT coefficients which are pre-set for each of the pictures, together with a set of image DCT coefficients as a set of DCT coefficients within the compressed-image data and with a particular set of DCT coefficient which are obtained by performing DCT transformation for particular additional data, and obtaining a degree of coincidence of the set of image DCT coefficients and the particular set of DCT coefficients;

storing, as a picture number, picture ID information for identifying a position, in time series, of a picture whose degree of coincidence is equal to or greater than a predetermined value; and comparing the picture ID information of the compressed-image data which is to be input and the stored picture number, obtaining the degree of coincidence when the picture ID information and the stored picture number coincide with each other, and determining that the additional data is added to the compressed-image data when the obtained degree of coincidence is equal to or greater than a predetermined value.

* * * * *

UNITED STATES PATENT AND TRADEMARK OFFICE
CERTIFICATE OF CORRECTION

PATENT NO. : 6,668,017 B1
DATED : December 23, 2003
INVENTOR(S) : Junya Watanabe It is certified that error appears in the above-identified patent and that said Letters Patent is hereby corrected as shown below:

Column 1,
Line 48, after first occurrence of the word "data" insert -- . --

Column 6,
Line 2, delete "1 st" insert -- $1^{st}$ --
Line 21 after the word "image" delete "data is image data of a"
Delete lines 22 through 58 insert after the word "image" -- analyzer 102 through the track 115, of the target image data being analyzed by the compressed-image analyzer 102. The setting unit 113 inputs also a degree of coincidence, which is transmitted from the additional data detector 110 through the track 112 and output by the additional data detector 110, and stores the input image ID number and the degree of coincidence in a manner corresponding to each other in the memory.
   The setting unit 113 comes out a process for taking statistics of the past data stored in the internal memory. The setting unit 113 estimates a timing (image ID information) at which the highest degree of coincidence of image data can be obtained. The setting unit 113 sets an image ID number of image data having the estimated highest degree of coincidence into the position data buffer 306.
   The position determinator 303 compares image ID information sent from the compressed-image analyzer 102 through the track 115 and image ID information stored in the position data buffer 306. When determined that both image ID information coincide with each other with a high degree of coincidence, the position determinator 303 transmits an active signal to switch 106 through the track 114. On the contrary, when determined that both image ID information do not coincide with each other with a high degree of coincidence, the position determinator 303 transmits and inactive signal to the switch 106 through the track 114.
   Operations of the additional data detection apparatus 100 having the above structure will now be described.
   A user sets target image data to be analyzed and a set of DCT coefficients into the compressed-image analyzer 102. For example, the user sets thereto the fourth block of each picture included in the target image data.
   The user registers the set of DCT coefficients corresponding to additional data to be extracted, into the memory of the additional data detector 110.
   When the compressed-image analyzer 102 receives compress-image data, it analyzes the image data. The compressed-image analyzer 102 determines whether the --
Line 28 after the word "started" insert -- . --

Column 7,
Delete lines 1 through 30, insert -- data is image data of a predetermined image (in the above example, an image of the fourth block). When determined that the compressed-image data is the image data of the predetermined image, it outputs a starting signal to the switch 106 through the track 103. That is, in the above example, the compressed-

UNITED STATES PATENT AND TRADEMARK OFFICE
CERTIFICATE OF CORRECTION

PATENT NO. : 6,668,017 B1
DATED : December 23, 2003
INVENTOR(S) : Junya Watanabe It is certified that error appears in the above-identified patent and that said Letters Patent is hereby corrected as shown below:

Column 7, (cont)
image analyzer 102 outputs a starting signal, when supplying of the image data of the image of the fourth block is started. Subsequently, the compressed-image analyzer 102 outputs a set of extracted DCT coefficients to switch 106 through the track 104. After the supplying of the fourth block is completed, the compressed-image analyzer 102 outputs a completion signal to the additional data detector 110 via the switch 106 through the track 109.

In the case where each picture including the specified fourth block is estimated to have a preferable degree of coincidence on the basis of the past data, the setting unit 113 outputs an active signal to the switch 106 through the track 114. On the contrary, in the case where such a picture is estimated as not to have a preferable degree of coincidence on the basis of the past data, the setting unit 113 outputs an inactive signal to the switch 106 through the track 114.

FIG. 4 illustrates image ID information and degrees of coincidence. The image ID information and the degrees are stored in the internal memory. In the case where the compressed-image analyzer 102 outputs image ID information, representing that the frames of "I" frame to the third frame within one picture are analyzed, relatively a high degree of coincidence can be expected. The compressed-image analyzer 102 outputs an active signal. On the contrary, in the case where like compressed-image analyzer 102 outputs image ID information, representing that the frames of "I" frame to the seventh frame within one picture are analyzed, relatively a high degree of coincidence is expected. The compressed-image analyzer 102 outputs an inactive signal. Note that the statistical method for estimating the degree of coincidence is arbitrary.

In the case where an active signal is transmitted to the switch 106 through the track --

Signed and Sealed this

First Day of March, 2005

JON W. DUDAS
*Director of the United States Patent and Trademark Office*

UNITED STATES PATENT AND TRADEMARK OFFICE
CERTIFICATE OF CORRECTION

PATENT NO. : 6,668,017 B1
DATED : December 23, 2003
INVENTOR(S) : Junya Watanabe It is certified that error appears in the above-identified patent and that said Letters Patent is hereby corrected as shown below:

Column 6,
Line 28, after the word "started" insert -- . --

Signed and Sealed this

Tenth Day of May, 2005

JON W. DUDAS
*Director of the United States Patent and Trademark Office*